United States Patent [19]
Brennan et al.

[11] 3,914,500
[45] Oct. 21, 1975

[54] TUNGSTEN WIRE REINFORCED SILICON NITRIDE ARTICLES AND METHOD FOR MAKING THE SAME

[75] Inventors: John J. Brennan, Portland; Richard C. Novak, Glastonbury; Michael A. De Crescente, Wethersfield, all of Conn.

[73] Assignee: United Aircraft Corporation, East Hartford, Conn.

[22] Filed: Sept. 4, 1973

[21] Appl. No.: 394,433

[52] U.S. Cl. ............... 428/295; 29/191.6; 156/166; 156/180; 252/477 R; 264/60; 428/378; 428/389
[51] Int. Cl............................................. B32b 5/02
[58] Field of Search .................. 161/60, 143, 176, 161/207; 264/56, 60; 29/191.2, 191.4, 191.6; 252/477 R; 117/128, 66, 62.2; 156/166, 180, 181

[56]         References Cited
            UNITED STATES PATENTS

| 3,427,185 | 2/1969 | Cheatham et al.................. | 117/128 |
| 3,766,000 | 10/1973 | Gibson et al....................... | 161/170 |

FOREIGN PATENTS OR APPLICATIONS

| 1,646,666 | 1/1972 | Germany .............................. | 264/56 |
| 2,010,322 | 2/1970 | France................................. | 264/56 |
| 41-10337 | 6/1966 | Japan................................... | 264/60 |
| 954,285 | 2/1964 | United Kingdom................... | 264/60 |
| 331,047 | 6/1970 | U.S.S.R............................... | 264/60 |

*Primary Examiner*—George F. Lesmes
*Assistant Examiner*—Stanley S. Silverman
*Attorney, Agent, or Firm*—Jonn D. Del Ponti

[57]            ABSTRACT

A reinforced ceramic article suitable for use in a gas turbine engine environment comprises a matrix material of $Si_3N_4$ with reinforcing filaments of tungsten embedded therein. The article has improved impact strength and thermal shock resistance. A method for making the article is also disclosed.

6 Claims, 1 Drawing Figure

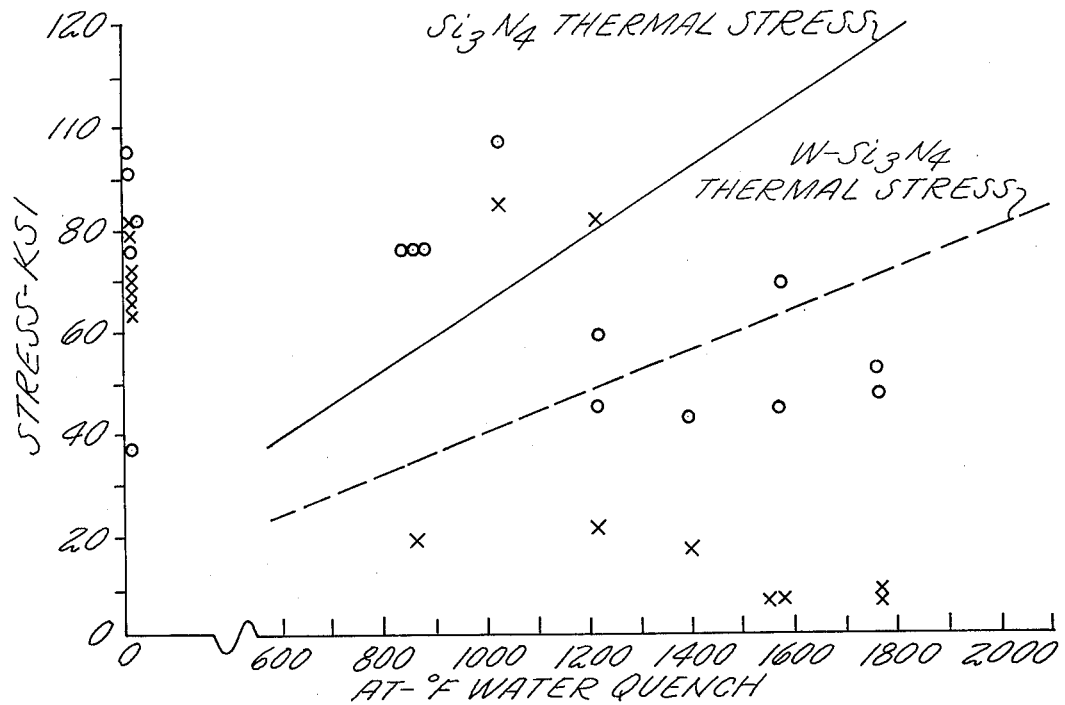

TUNGSTEN WIRE REINFORCED SILICON NITRIDE ARTICLES AND METHOD FOR MAKING THE SAME

BACKGROUND OF THE INVENTION

1. Field of the Invention

This invention relates to fiber-reinforced ceramic matrix composites.

2. Description of the Prior Art

Ceramic materials, by virtue of their high melting points and oxidation resistance, can offer large gains in gas turbine performance, provided some serious limitations can be overcome. These limitations are poor thermal shock resistance and, more critically, low impact strength. It is recognized in the prior art that ceramic matrices reinforced with filaments of various materials may have good impact strength. For example, U.S. Pat. No. 3,386,840 to Gruber suggests that fibers of silicon-carbide varying in length from about 250 Angstroms to 1 inch maximum, may be used to improve the strength of refractory metals such as nitrides. In column 8 example 7, Gruber indicates that sillimanite ($Al_2O_3 \cdot SiO_2$) containing 10 percent of these relatively short fibers of silicon-carbide was found to have a greater impact strength than the ordinary sillimanite without this additive. Cheatham et al, U.S. Pat. No. 3,427,185, suggests forming a composite structural material by plasma arc spraying or vapor depositing the matrix material over a mat of filamentary material. In column 6 he lists a large number of filamentary materials, such as tungsten, and matrix materials, including some ceramics, which he suggests may be combined in the manner of his invention; however, his only example is that of using high carbon steel wires in a matrix of aluminum. It cannot be determined from the patent whether any other combinations were tried and what results were obtained.

Despite the various combinations of matrices, including ceramic matrices and fiber reinforcements discussed in the prior art, none to date have proven entirely satisfactory for use in gas turbine engines, and more particularly for use as blades or vanes in gas turbine engines. Despite the claims for higher impact strength, the impact strength of prior art ceramic matrix composites have not been satisfactory.

This application is related to the subject matter of copending U.S. patent application Ser. No. 394,432 entitled, "Tantalum Wire Reinforced Silicon Nitride Articles and Method for Making the Same" by J. Brennan, filed on even date herewith and of common assignee with the present application.

SUMMARY OF THE INVENTION

An object of the present invention is a fiber-reinforced ceramic matrix composite material suitable for use in a gas turbine engine.

Another object of the present invention is a fiber-reinforced ceramic matrix composite having a relatively high impact strength and thermal shock resistance.

Accordingly, the present invention is a fiber-reinforced ceramic article comprising densified hot-pressed silicon nitride ($Si_3N_4$) reinforced with continuous filaments of tungsten (W).

It has been found by Charpy impact testing that this material, at high temperatures such as those encountered in a gas turbine engine, is able to absorb many times the energy of unreinforced hot-pressed silicon nitride. Ability to withstand thermal shock is also significantly improved.

In one embodiment $Si_3N_4$ + 5% MgO with tungsten filaments was hot-pressed at 1650°C, 4000 psi for 1 hour. Test specimens were made in this manner using both $\alpha$ - $Si_3N_4$ and $\beta$ - $Si_3N_4$ as the matrix material. Both resulted in greatly improved impact strength at 1300°C.

The selection of a suitable ceramic matrix material for use, for example, as a high temperature fiber-reinforced composite gas turbine engine vane, depends upon a number of factors. Among these are: ease of fabrication, strength at elevated and room temperatures, oxidation and corrosion resistance, thermal shock resistance, creep strength, and impact resistance. Many ceramic materials meet the criteria of strength and oxidation resistance at the temperature of interest, which in our case is about 2400°F, but do not have good thermal shock resistance. The refractory oxides fall in this category. For example, zirconium diboride and silicon carbide are strong and oxidation resistant materials. Zirconium diboride, however, does not possess very good thermal shock resistance and also requires temperatures on the order of 2100°C for fabrication, which for a number of reasons is much too high for successful incorporation of reinforcing fibers, as will be further discussed. Silicon carbide must also be hot pressed above 2000°C for complete densification and has been found to completely react with fibrous additions of W, $B_4C$ and $Al_2O_3$ under these conditions. Silicon nitride, on the other hand, does not have these drawbacks and has been found to be an excellent ceramic matrix material when reinforced with tungsten wires.

Many reinforcing fibers were considered for use with the silicon nitride matrix, however, of those initially considered, none were found satisfactory except tungsten. For example, it is desirable that the coefficient of thermal expansion of a filament used in reinforcing a ceramic matrix be greater than that of the matrix so that on cooling from the fabrication temperature the ceramic matrix is put into a compressive prestress. Thus, when $Al_2O_3$ fibers are used in a silicon nitride matrix, their very high coefficient of thermal expansion results in extremely large prestresses in the fibers such that tensile failures occur on cooling from the fabrication temperature. For this reason $Al_2O_3$ fibers are not acceptable. In this regard, silicon carbide fibers (SiC) were successful in putting a compressive prestress in the ceramic matrix; however, during the hot-pressing operation at 1650°C a reaction took place within the fiber, between its tungsten core and the silicon carbide, forming tungsten silicide which reduced the ultimate tensile strength of the reinforcing silicon carbide fiber to below acceptable levels making it useless for the applications under consideration.

Attempts were made to hot-press the silicon nitride at lower temperatures to avoid the undesirable reactions which take place with various types of reinforcing filaments. However, with MgO as the densification aid, satisfactory densification does not occur below 1600°C. Other satisfactory densification aids could not be found.

Attempts were made to find coatings for the filaments which would prevent or reduce unfavorable reactions at the high hot-pressing temperatures, but all such attempts were unsuccessful for one reason or another.

The foregoing and other objects, features and advantages of the present invention will become more apparent in the light of the following detailed description of preferred embodiment thereof and as illustrated in the accompanying drawing.

BRIEF DESCRIPTION OF THE DRAWING

FIG. 1 is a graph wherein the thermal shock resistance of tungsten reinforced $Si_3N_4$ may be compared to the thermal shock resistance of unreinforced $Si_3N_4$.

DESCRIPTION OF THE PREFERRED EMBODIMENTS

In one embodiment of the present invention, the composite structure is produced from a layup of several plies or sheets. Each sheet comprises 25 volume percent tungsten wires slurry coated with a mixture of $Si_3N_4$ plus 5% by weight MgO powder for densification and including a binder, which in this preferred embodiment is polystyrene dissolved in toluene, which cures at room temperature. These plies or sheets are stacked to a desired thickness and then hot-pressed at 1650°C, 4000 psi for 1 hour or at least until full densification of the matrix is approached. The resulting structure of this preferred embodiment is over 99% dense. During the hot-pressing operation a layer of tungsten silicide forms around each wire which bonds the wires to the matrix material. As a result of this bond the wires are able to induce a compressive stress in the ceramic, which is required for engine applications.

Care is taken to assure that the finished article does not have any exposed tungsten wires. This is desirable in the corrosive environment of a gas turbine engine but not necessarily mandatory since at high temperatures a protective coating forms on the surface of exposed tungsten wires. Satisfactory test specimens were made using tungsten wires having diameters ranging from 5 to 10 mils. Satisfactory test specimens were also fabricated with a volume percent of tungsten wires within the range of from 15 to 45%. It is by no means intended to limit the present invention to within these ranges.

In this preferred embodiment the tungsten wires in each sheet are continuous and parallel and the wires within adjacent sheets are parallel to each other; however, very satisfactory results may be obtained by having the wires of adjacent sheets at an angle with respect to each other to form a diamond shaped pattern.

Test samples were made up according to the above procedure using both $\beta$ - $Si_3N_4$ and $\alpha$ - $Si_3N_4$ reinforced with tungsten wire. Both compositions show substantial gains in impact strength at 1300°C over unreinforced hot pressed $Si_3N_4$; although there is essentially no gain in impact strength at room temperature. Comparisons of the modulus of rupture of reinforced versus unreinforced hot pressed $\beta$ - $Si_3N_4$ show substantial gains at room temperature as well as at 1400°C. Tables I and II below display the data from these tests.

TABLE I

| | $\alpha$ - $Si_3N_4$ and $\alpha$ - $Si_3N_4$ — W Composite Properties | |
|---|---|---|
| Property | $\alpha$ - $Si_3N_4$ + 5% MgO | $\alpha$ - $Si_3N_4$ + 5% MgO + 25 Vol% W |
| Modulus of Rupture | | |
| Room Temp | 110 Ksi | 75 Ksi |
| 1400°C | 20 Ksi | No data |
| Charpy Impact | | |
| Room Temp | .45 ft-lb | .50 ft-lbs. |
| 1300°C | .40 ft-lb | 1.20 ft-lbs. |

TABLE II

| | $\beta$ - $Si_3N_4$ and $\beta$ $Si_3N_4$ — W Composite Properties | |
|---|---|---|
| Property | $\beta$ - $Si_3N_4$ + 5% MgO | $\beta$ - $Si_3N_4$ + 5% MgO + 25 Vol% W |
| Modulus of Rupture | | |
| Room Temp | 72 Ksi | 95 Ksi |
| 1400°C | 23 Ksi | 40 Ksi |
| Charpy Impact | | |
| Room Temp | .49 ft-lbs. | .51 ft-lbs. |
| 1300°C | .25 ft-lbs. | 2.25 ft-lbs. |

From Table I it can be seen that $\alpha$ - $Si_3N_4$ tungsten reinforced composite has three times the impact strength of its unreinforced counterpart at 1300°C. From Table II it can be seen that $\beta$ - $Si_3N_4$ tungsten reinforced composite structure had nine times the impact strength of its unreinforced counterpart.

From the foregoing it can be seen that both $\alpha$ and $\beta$ hot-pressed silicon nitride reinforced with tungsten wires have greatly improved impact strength at high temperatures, the $\beta$ silicon nitride matrix being preferred. In the claims the use of the term $Si_3N_4$ without an $\alpha$ or $\beta$ prefix is intended to include either $\alpha$ - $Si_3N_4$ or $\beta$ - $Si_3N_4$.

The graph and data displayed in FIG. 1 show that tungsten reinforced $Si_3N_4$ offers significantly better resistance to thermal shock than does unreinforced bulk $Si_3N_4$. The solid line represents the calculated thermal stress, as a function of quench temperature, which would result from quenching small specimens of unreinforced $Si_3N_4$ in water. The broken line represents the calculated thermal stress for tungsten reinforced $Si_3N_4$. The stress in the tungsten reinforced $Si_3N_4$ is smaller, primarily as a result of its higher thermal conductivity.

Also displayed on the graph of FIG. 1 are data points of room temperature modulus of rupture values of specimens quenched from the indicated temperatures. The x's are data points for tungsten reinforced $Si_3N_4$ and the O's are data points for the unreinforced $Si_3N_4$. It is apparent that above quench temperatures of 1200°F the tungsten reinforced $Si_3N_4$ is much stronger than the unreinforced $Si_3N_4$.

Although the invention has been shown and described with respect to preferred embodiments thereof, it should be understood by those skilled in the art that various changes and omissions in the form and detail thereof may be made therein without departing from the spirit and the scope of the invention.

Having thus described typical embodiments of our invention, that which we claim as new and desire to secure by Letters Patent of the United States is:

1. An impact resistant fiber-reinforced composite article suitable for use in a gas turbine engine environment comprising a plurality of continuous tungsten wires preferentially oriented in a hot-pressed $Si_3N_4$ matrix, which approaches full densification, each of said wires having a layer of tungsten silicide thereon, said tungsten silicide layer being chemically bonded to said wires and said matrix and said matrix being in compression as a result of said bond.

2. The fiber-reinforced composite article according to claim 1 wherein said matrix includes MgO as a densification agent.

3. The fiber-reinforced composite article according to claim 1 wherein said $Si_3N_4$ is $\beta$ - $Si_3N_4$.

4. An impact resistant fiber-reinforced composite article suitable for use in a gas turbine engine environment comprising a plurality of plies bonded together, each ply including a plurality of continuous tungsten wires preferentially oriented in a hot-pressed $Si_3N_4$ matrix, which approaches full densification, each of said wires having a layer of tungsten silicide thereon, said tungsten silicide layer being chemically bonded to said wires and said matrix and said matrix being in compression as a result of said bond.

5. The fiber-reinforced composite article according to claim 4 wherein said matrix material includes MgO as a densification agent.

6. The fiber-reinforced composite article according to claim 4 wherein said $Si_3N_4$ is $\beta$ - $Si_3N_4$.

* * * * *